Nov. 15, 1960　　　R. C. STRAUSS　　　2,960,200
TRANSMISSION CONTROL
Original Filed Dec. 3, 1952　　　　5 Sheets-Sheet 1
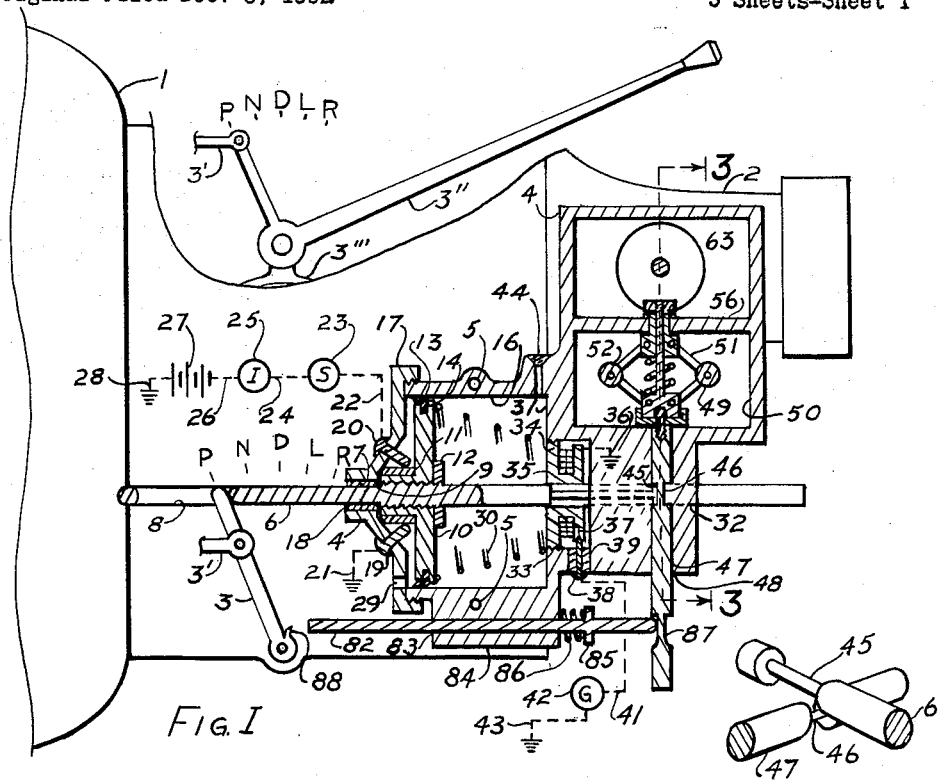
Fig. 1
Fig. 2
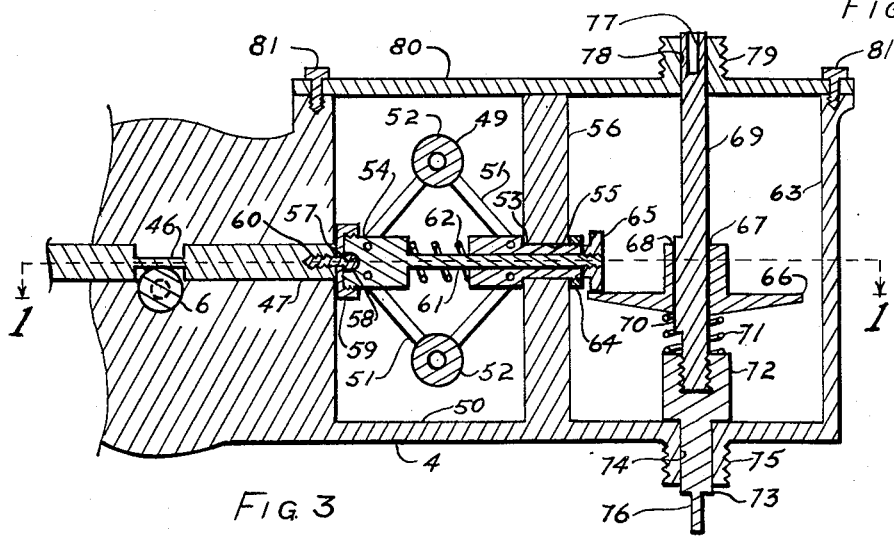
Fig. 3
INVENTOR.
Ray C. Strauss Nov. 15, 1960 R. C. STRAUSS 2,960,200
TRANSMISSION CONTROL
Original Filed Dec. 3, 1952 5 Sheets-Sheet 2
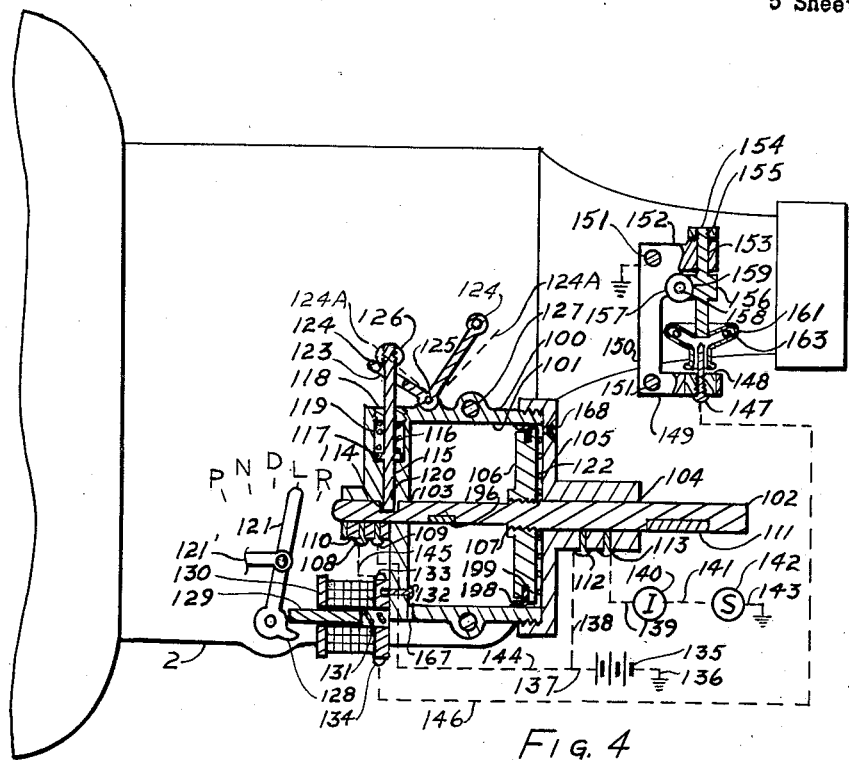
Fig. 4
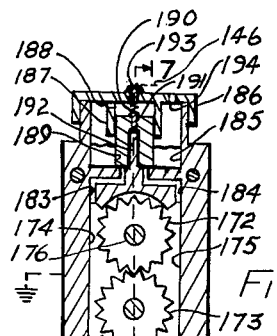
Fig. 6
Fig. 5
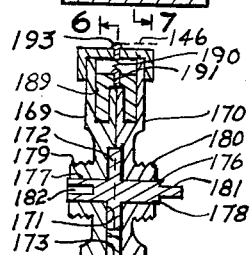
Fig. 7
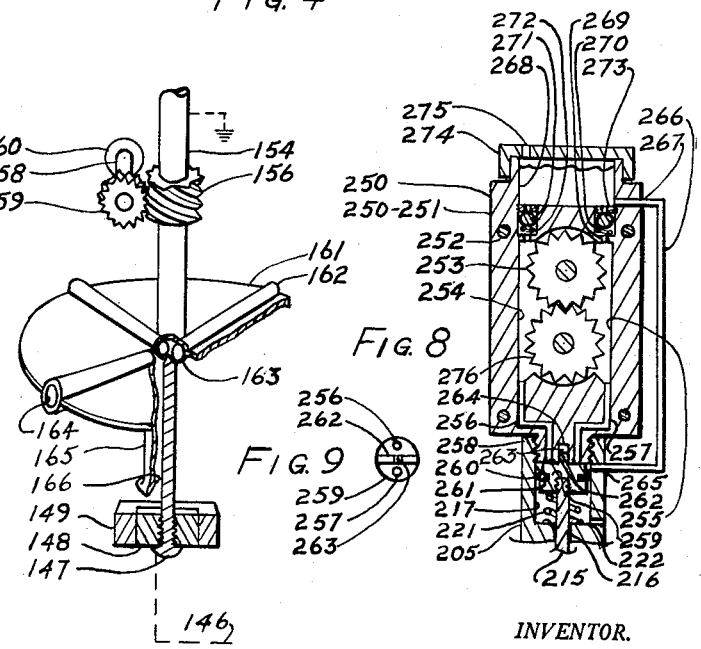
Fig. 8
Fig. 9
INVENTOR.
Ray C. Strauss Nov. 15, 1960  R. C. STRAUSS  2,960,200
TRANSMISSION CONTROL
Original Filed Dec. 3, 1952  5 Sheets-Sheet 3
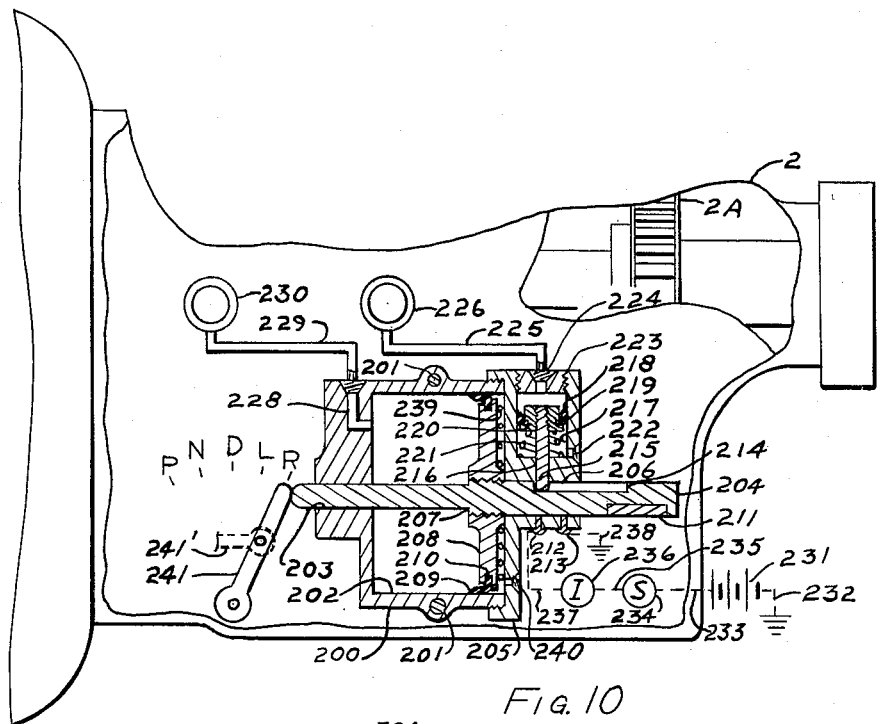
Fig. 10
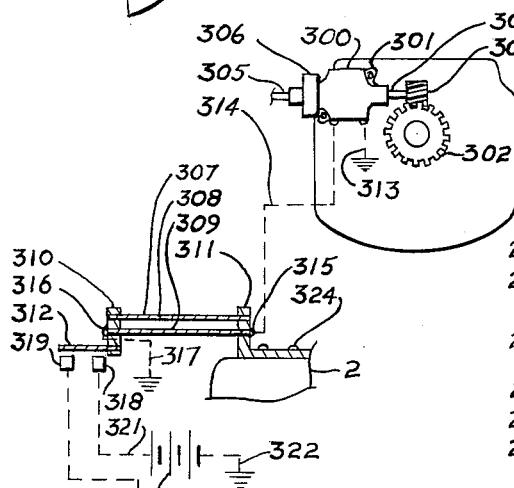
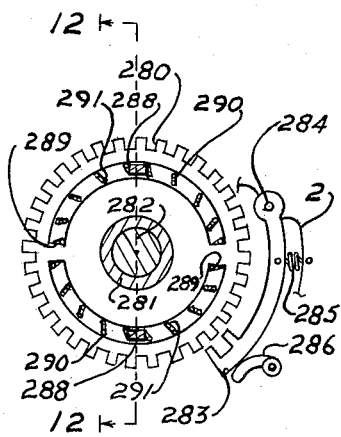
Fig. 12  Fig. 11
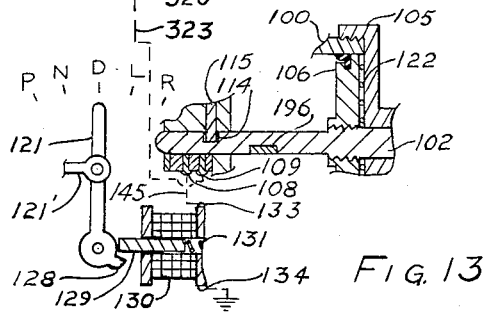
Fig. 13
INVENTOR.
Ray C. Strauss INVENTOR.
Ray C. Strauss Nov. 15, 1960 R. C. STRAUSS 2,960,200
TRANSMISSION CONTROL
Original Filed Dec. 3, 1952 5 Sheets-Sheet 5

INVENTOR.
Ray C. Strauss

United States Patent Office 2,960,200
Patented Nov. 15, 1960

2,960,200

TRANSMISSION CONTROL

Ray C. Strauss, 933 S. Forest, Ann Arbor, Mich.

Continuation of application Ser. No. 323,787, Dec. 3, 1952. This application Apr. 24, 1957, Ser. No. 654,700

15 Claims. (Cl. 192—4)

This invention relates to motor vehicles having change speed transmissions and particularly to a device for positioning the transmission selector lever at an out-of-gear position so that the motor may be started in safety.

The principal object of this invention is to improve the construction and operation of the out-of-gear positioning and starting mechanism shown in my copending application for Letters Patent of the United States, filed October 8, 1951, Serial No. 250,334, this application being a continuation of my copending application Serial No. 323,787, filed December 3, 1952 and now abandoned.

Another object of this invention is to provide in combination with an automatic transmission a fully automatic means for moving the selector lever of the transmission to an out-of-gear position upon stopping of the motor, first to neutral position if the wheels of the vehicle are rotating, and second to parking position if the wheels are not rotating, said automatic means being interconnected with the starter, if desired, so that with the ignition switch in an "on" position the motor will be automatically restarted and the selector lever will be immediately freed for manual return to an in-gear position such as "Drive," "Low," "Reverse."

Another object of this invention is to provide in combination with an automatic transmission a fully automatic means for moving the selector lever to an out-of-gear position upon turning of the ignition switch to "off," the movement of the selector lever being first to neutral position if the vehicle wheels are rotating, and then to parking when the wheels stop rotating, so that the driver in making maneuvers to leave the vehicle unattended may ignore the handbrake and need not manually move the selector lever to parking as a guarantee against movement of the vehicle.

Another object of this invention is to provide a vehicle movement indicator means having a solenoid with a core blocking automatic movement of the selector lever to parking and a solenoid circuit controlling switch sensitive to very slight forward or backward movement of the vehicle for holding open the solenoid circuit to prevent the automatic movement of the selector lever to parking while the vehicle is moving, and for closing said solenoid circuit when the vehicle stops, whereupon said solenoid core will withdraw from its blocking position and said selector lever will be automatically moved to parking.

Another object of this invention is to provide a vehicle movement indicator means in the form of an hydraulic pump, said pump being either the customary driveshaft driven pump built into an automatic transmission or an accessory type of driveshaft driven pump to produce a pressure for preventing the movement of the selector lever to parking as long as the vehicle is moving forwardly or backwardly and to permit through drop of pressure such movement of the selector lever to parking when the vehicle stops moving.

Another object of this invention is to provide a vehicle movement indicator means for not only preventing movement of the selector lever to parking while the vehicle is moving but also to prevent or restrain movement of the selector lever to reverse gear position as long as the vehicle is moving at a speed at which reverse gear selection would be damaging to the transmission so that the customary barriers built into the selector lever linkage over which the selector lever is customarily lifted to move to parking and reverse gear positions may be eliminated and the selector lever need be moved only in a lateral path directly to the selected position when the movement indicator means permits.

Another object of this invention is to provide in combination with this device a vehicle movement indicator means which permits the selector lever to be automatically moved to parking only if the vehicle is not moving or is moving at a very slow rate of speed so that damage to the driveshaft and transmission will not occur upon engagement of the parking pawl customarily built into an automatic transmission for engagement with the driveshaft.

Another object of this invention is to provide in combination with this device and the above-mentioned movement indicator means a cushioning means to cooperate with the said parking pawl of the automatic transmission to provide initial yieldability upon engagement of the pawl and driveshaft to lessen the strain upon the locking parts.

Another object of this invention is to provide a governor-weight type vehicle movement indicator means of unique design whose flyweights will extend to their centrifugal limits upon vehicle acceleration more quickly and at lower vehicle speed than similar flyweights on a governor of standard construction, and in deceleration of the vehicle shall hold to the said centrifugal limits to a lower deceleration vehicle speed than the flyweights of a standard governor, thereby holding the transmission parking pawl from engagement with the driveshaft to a lower speed than would a standard governor if the latter were employed in this combination.

Another object of this invention is to provide a safety feature which will prevent the manual movement of the selector lever to parking until the vehicle has come to a stop or near-stop and the motor is not operating, so that the operator will be prevented from manually engaging the parking pawl under transmission damaging conditions.

Another object of this invention is to provide an automatic out-of-gear positioning device especially suitable for accessory installation wherein the built-in switch customarily connected with the shifter linkage of an automatic transmission to close the starting motor circuit is utilized by this device for automatic starting, so that the cost of a starter circuit switch may be eliminated from this device.

Another object of this invention is to provide an out-of-gear positioning device which allows the parking position of the selector lever to be at the same location as the neutral position of the lever, so that with the shifting of the transmission to a neutral position it will lock into a parked condition as soon as the vehicle stops moving, said automatic device being connectible with the starter of the vehicle for automatic operation in the neutral parking position of the selector lever.

Another object of this invention is to provide additional methods over those shown in my copending application for Letters Patent of the United States, filed October 8, 1951, Serial Number 250,334, for withholding the device from action on the selector toward the neutral position.

Attention is hereby directed to the accompanying drawings illustrating various forms of my invention wherein like reference characters refer to like parts throughout the views:

Fig. 1 is a cross-sectional view cut along lines 1—1 in Fig. 3 of a vacuum actuated and governor controlled form of the out-of-gear positioning device shown mounted on a vehicle transmission, with the transmission selector lever separately shown in a plan view wherein it is mounted on the steering column of the vehicle in the same relative position as the shift lever of the transmission;

Fig. 2 is a fragmentary perspective view of the interlocking shafts 6 and 47 of Fig. 1;

Fig. 3 is a cross-sectional view of the governor controlling portion of the device shown in Fig. 1, cut along the lines 3—3 in Fig. 1;

Fig. 4 is a sectional view of a vacuum actuated, accelerator and solenoid controlled form of the device;

Fig. 5 is a cutaway perspective view of the governor-gravity switch control used with the solenoid of Fig. 4;

Fig. 6 is a cross-sectional view of an accessory type of hydraulically controlled switch for the solenoid used in Fig. 4, taken on line 6—6 of Fig. 7;

Fig. 7 is an end sectional view of the accessory hydraulic switch of Fig. 6, taken on line 7—7 of Fig. 6;

Fig. 8 is a sectional view of a hydraulic pump for delivery of pressure to piston rod 215 substituting for the hydraulic pump 226 shown in Fig. 10;

Fig. 9 is a plan view of piston 259 showing the upstanding slotted ridge formed therewith, shown in Fig. 8;

Fig. 10 is a sectional view of a hydraulically actuated, hydraulically pressured latch controlled form of the device, carried within an automatic transmission as an operating part thereof;

Fig. 11 is an end view of a driveshaft mounted resilient parking gear and an engageable parking pawl;

Fig. 12 is a cross-sectional view of the parking gear shown in Fig. 11 taken on a line 12—12 in said Fig. 11;

Fig. 13 is a somewhat diagrammatic view of a thermocouple, driveshaft energized, switch for controlling the action of solenoid 130 shown in Fig. 4;

Figure 14:
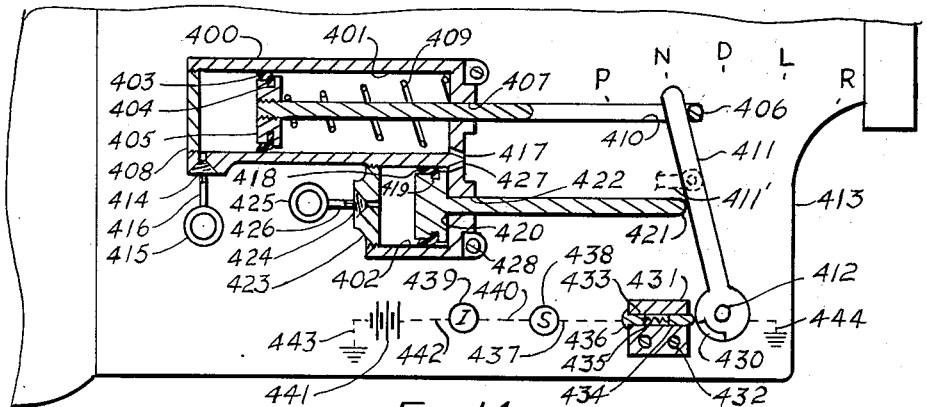
Fig. 14 is a sectional view of a hydraulically actuated form (shown inactive) of the out-of-gear positioning device together with a hydraulic pressuring device (shown active) for holding the shift lever out of parking position, along with a starter control switch shown to be closed.

Referring now to Fig. 1 there is shown fluid coupling 1 of a motor vehicle joined to automatic transmission 2 which carries power output controlling shift lever 3 for positioning the transmission at parking (as shown) wherein the vehicle is locked against movement, at neutral, drive, low, and reverse. Shift lever 3 joins flexibly through interconnecting linkage assembly 3′ to the selector lever 3″ mounted on the steering column of the vehicle by way of bracket 3‴. An L-shaped casting 4 is attached to the side of transmission 2 through cooperating bolts 5 in a position to align shaft 6, in bearing 32 of casting 4, with the free end of lever arm 3. Arm 3 rides in cut 8 of shaft 6 so that when driven counterclockwise through abutment with shaft 6 at an end limit of cut 8 it will be moved to parking position and when driven clockwise through abutment with the opposite end limit of cut 8 it will be moved to the neutral position. Shaft 6 is threaded at shoulder 9 to engage piston 10, constructed of electrically non-conducting material, which carries upon its faces at their hubs electrically conducting ring 11 and magnetically responsive soft iron ring 12. Piston ring 13 snaps into groove 14 cut into the rim of piston 10 and rides against the surface of cylindrical area 16 in casting 4.

Electrically non-conducting end cap 17, threaded to engage the open end of casting 4, holds in bearing opening 7 at its axial center a bearing sleeve 18 which, in turn, receives shaft 6 and carries at an angle embedded terminal screws 19 and 20 aligned at the inner face of end cap 17 to contact electrically conducting ring 11. Terminal screw 19 is grounded at the outer face of end cap 17 through lead 21, while terminal screw 20 connects through lead 22 to the starter or starter solenoid switch 23, starter 23 being grounded through lead 24, ignition switch 25, lead 26, battery 27, and lead 28. An air port 29 is drilled in end cap 17 between the inner and outer surfaces of end cap 17 behind piston 10.

Spring 30 bears at one end on piston 10 and at the other end on end wall 31 formed in casting 4. Where bearing opening 32 in casting 4 receives shaft 6, end wall 31 is recessed and partially threaded at 33 to cooperate with threaded flange 34 of solenoid assembly 35 carried therein. One end of the winding of solenoid assembly 35 is grounded by lead 36 to casting 4, and through lead 37 attached to the opposite end of the winding contacts set screw 38 projecting through electrically non-conducting insert 39 embedded in casting 4. Lead 41 joins setscrew 38 to generator 42 of the motor of the vehicle, lead 43 grounding the generator, so that whenever the motor of the vehicle is operating then current will pass through solenoid assembly 35 to set up attracting magnetic lines of force.

If the ignition switch 25 is now turned to "on" with piston 10 in the position shown in Fig. 1 wherein terminal screws 19 and 20 are in contact with conductor ring 11 to complete the circuit with battery 27, a current will be set up through the starter so that the motor of the vehicle will be put into operation. As soon as the motor becomes self operating, tubing connecting the manifold of the motor with threaded port 44 will cause vacuum to move piston 10 to end wall 31, compressing spring 30.

An elongated groove cut 45 encircling shaft 6 is so located the shaft may be moved freely between reverse and neutral positions. When cut 46 on shaft 47, carried in bearing opening 48 at right angles to and partially intercepting bearing opening 32, registers with shaft 6, then shaft 6 may be moved freely and without interference into parking. As shown in Fig. 2, with the registry of cuts 45 and 46 spring 30 will be permitted to expand and drive piston 10 to seat against the end cap 17, the parking position, at which position piston 10 is shown to be in Fig. 1.

Endward movement of shaft 47 is controlled by attached governor assembly 49 mounted in routed out compartment 50 in the upwardly projecting leg of L-shaped casting 4. Governor links 51 pivotally connect weights 52 to bearing 53 and bearing 54. Bearing 53 rides in bearing opening 55 of wall 56 which is an integral part of casting 4, and bearing 54 having spherically routed out area 58, rides over ball end 57 of shaft 60. Shaft 60, threaded into larger shaft 47, is held in area 58 by apertured threaded cap 59 cooperating with bearing 54. A shaft 61 is formed integrally with and at the axial center of bearing 54 to project through and ride in the axially drilled center of bearing 53, an expansion spring 62 being disposed on shaft 61 between bearings 53 and 54, urging 53 and 54 apart.

Upon the opposite side of wall 56 there is formed a second compartment 63 wherein bearing 53 is threaded to collar 64, and extending threaded shaft 61 is capped by centrally threaded wheel 65. A wheel of larger diameter 66 frictionally engages wheel 65 at right angles and through its apertured center 67 and guide groove 68 rides shaft 69 and spline 70 formed integrally with shaft 69. Spring 71, passed over shaft 69, bears against the lower surface of wheel 66 and against enlarged collar end 72 of shaft 73 threaded to the lower end of shaft 69, so that wheel 66 is held with constant tension against wheel 65. Shaft 73 rides in bearing opening 74 of boss 75 formed on casting 4, shaft 73 having formed on its lower end rectangular projection 76 for engagement with the speedometer take-off shaft meshing in the customary manner with the vehicle's driveshaft, boss 75 being suitably threaded on its outer shoulder to engage a threaded collar coupling for attachment to a mating boss on the transmission through which the takeoff shaft customarily emerges.

Shaft 69 has formed at its opposite end a rectangular recessed cut 77 for the acceptance of the vehicle's speedometer cable, shaft 69 riding in bearing opening 78 of boss 79 formed in cover plate 80. Plate 80 is held to casting 4 by means of screws 81, and boss 79 is externally threaded to engage the customary coupling surrounding the vehicle's speedometer shaft housing.

With the construction here shown it will be evident that wheel 66 frictionally driving wheel 65 will have the effect of initially spinning shaft 61 at a relatively high rate of speed in relation to wheel 66 since small wheel 65 bears at the outer edge of larger wheel 66 where the takeoff effects a high ratio multiplication. Governor weights 52, consequently, will be speedily rotated to move outwardly rapidly thereby compressing spring 62. Projecting shaft 61, induced by laterally moving bearing 54, will therefore quickly move wheel 65 toward the axial center of wheel 66 to lower the takeoff ratio and feather off the rate of acceleration for governor weights 52 as the vehicle moves faster and wheel 66 rotates faster.

With this arrangement it will be evident that as the vehicle decelerates the spring 62, in attempting to expand and thereby move small wheel 65 toward the rim of large wheel 66, will be restrained by governor weights 52 attempting to hold to their centrifugal limits due to the increasing takeoff ratio that develops as wheel 65 moves toward the rim of wheel 66, so that the conflict of forces will result in holding the governor weights 52 in a centrifugally extended or partially extended position to a much lower driveshaft speed than if an ordinary governor were driven directly from the driveshaft in the conventional manner. The effort, therefore, of the governor to remain in rapid rotation until the driveshaft has nearly stopped has the effect of holding cut 46 of shaft 47 out of registry with cut 45 of shaft 6 until the vehicle has decelerated almost to the point of stopping whereupon spring 30 will be freed to force piston 10 against end cap 17, thereby driving shaft 6 and shift lever 3 to parking position.

Governor assembly 49 and shaft 47 may be further employed in this construction to prevent movement of shift lever 3 to reverse position while the vehicle is moving above a chosen minimum speed through cooperation with shaft 82 riding in bearing opening 83 of housing extension 84. Shaft 82 has formed therewith at an intermediate point on its surface collar 85, spring 86 passing over shaft 82 and bearing beteween housing extension 84 and collar 85. Spring 86 urges shaft 82 toward groove cut 87 in the lower end of shaft 47, so that when 82 is seated in 87 stub arm 88 attached to the pivotal end of shift lever 3 will be free for clockwise rotation into reverse gear position and will not be blocked in the movement. When shaft 47 is moved endwardly and upwardly so that shaft 82 is ejected from groove cut 87, shaft 82 will be forced toward shift lever 3 and the stub arm 88 will be blocked in its clockwise rotation, so that shift lever 3 will be unable to enter reverse gear position. This blocking situation occurs when governor 49 in rotating at speeds above approximately 5 miles per hour moves groove cut 87 away from registry with shaft 82.

In the operation of the mechanism so far described and with the mechanism in the position shown in Fig. 1, when the driver turns the ignition switch 25 to "on," current will flow through the starter circuit to start the motor of the vehicle. A vacuum condition developing in the motor upon starting will immediately cause piston 10 to compress spring 30 and shift to end wall 31 thereby breaking the starter circuit, drawing shift lever 3 from parking to neutral position, and freeing shift lever 3 for manual location at any in-gear position desired by the driver. Movement of piston 10 also moves groove cut 45 on shaft 6 to free groove cut 46 on shaft 47 for endward movement when governor assembly begins to rotate.

Self operation of the motor immediately causes the generator 42 to send an electric current through solenoid 35 to firmly hold piston 10 by means of magnetically responsive ring 12 against end wall 31, so that dropping off of vacuum through quick acceleration under motor load conditions will not cause piston 10 to move away from end wall 31. With groove cut 46 and shaft 47 free for endward movement and with the shift lever 3 at an in-gear position, movement of the vehicle either forwardly or backwardly will immediately put governor weights 52 into relatively rapid rotation to move shaft 47 and lock groove cut 46 out of registry with groove cut 45, so that even though the motor stalls while the vehicle is moving and while the governor is rotating effectively, piston 10, shaft 6, and shift lever 3 will be locked from movement into parking but will be freely manually movable between neutral and reverse, provided the vehicle is moving at speeds below 5 miles per hour when shaft 82 will be seated in groove cut 87. At speeds above 5 miles per hour shaft 82 will ride the surface of shaft 47 and stub arm 88 will be blocked by shaft 82 to prevent movement of shift lever 3 to reverse gear position.

Taking now the condition of a stalling motor while the vehicle is in movement and the governor is rotating effectively, under this condition vacuum will disappear from the manifold and generator output will stop, so that spring 30 will be free to expand to move piston 10, shaft 6, and lever 3 as far as neutral position, at which location the starter circuit will again be completed to restart the motor. Piston 10 will thereupon be drawn by the restored manifold vacuum to the end wall 31 breaking the starter circuit, and solenoid 35 will be reenergized to hold piston 10 in that position, shift lever 3 again being freed for in-gear positioning.

In the event the motor fails to restart immediately and the vehicle comes to a full stop; the governor in ceasing to rotate will then register cut 45 with cut 46, whereupon piston 10 will move to seat against end cap 17 and shaft 6 will move shift lever 3 to parking position to lock the vehicle against movement. The starter meanwhile will continue to crank the motor, and as soon as the motor again becomes self operating, piston 10 will move to end wall 31 and shift lever 3 will be pulled from parking position to neutral position from which location it may again be manually moved to an in-gear position.

Taking now the situation where the driver brings the vehicle to a stop in anticipation of turning off the motor and leaving the vehicle, he may now, whether the vehicle is fully stopped or still in motion, turn the ignition switch 25 to "off," so that piston 10 will immediately move shaft 6 and shift lever 3 as far as neutral position and, with the halting of the vehicle completely, registry of cut 45 with cut 46 will permit piston 10 to move shaft 6 and shift lever 3 to the parking position. With this arrangement the driver has been freed of the responsibility for setting the hand brake in leaving the vehicle or manually moving the selector lever to the parking position, inasmuch as at any time the vehicle stops moving and the ignition is "off" it will be automatically put in a non-rolling locked condition. When the driver returns to the vehicle and turns the ignition switch 25 to "on" again, the motor will automatically restart and the shift lever 3 will be moved to neutral position for unresisted manual movement to an in-gear position.

On many types of automatic transmissions a barrier is placed adjacent the parking position so that the driver must first consciously lift the selector lever to clear the barrier before entering the parking position. Even so, drivers have been known to move the selector lever to parking position while the vehicle is in motion, causing the teeth of the parking pawl and cooperating driveshaft gear to be shattered. Such a danger is completely eliminated by this described mechanism since under no condition can the selector lever be manually moved to the parking position, and in fact, can only be moved by automatic means to the parking position and then only when the vehicle stops moving.

With this mechanism the barrier adjacent the parking position, therefore, may safely be eliminated. Also, since the selector lever cannot be positioned at reverse above 5 miles per hour, the barrier adjacent the reverse position may likewise be eliminated, so that in handling the selector lever the driver no longer needs to lift the lever in going into reverse gear position. Though the reverse position may be locked out above any other chosen speed, 5 miles per hour is arbitrarily selected as a speed at which no severe damage will be done to the reverse gear assembly and a speed at which it is possible to effectively rock the vehicle between low and reverse when in mud or snow. If shift lever 3 is already positioned in reverse and shaft 82 is driven from groove 87 due to acceleration of the vehicle, shaft 82 will pass over stub arm 88 without contact so that shift lever 3 will remain in reverse.

Though no resistor is shown between generator 42 and solenoid 35, a resistor of approximately 3 ohms may be inserted in lead 41 to divert a substantial part of the generator output to the vehicle's battery circuit.

In Fig. 4 another form of this mechanism is shown. Cylindrical casting 100 carries at the axial center of cylindrical area 101 electrically non-conducting shaft 102 in bearing opening 103 and bearing opening 104 of electrically non-conducting end cap 105 threaded to casting 100. Piston 106 threads to shaft 102 at shoulder 107, piston ring 198 riding in cylindrical area 101 and snapping into groove 199 which is cut into the rim of piston 106. Shaft 102 carries electrically conducting insert 196 for registry with terminal screws 108 and 109 embedded in electrically non-conducting block 110, in turn embedded in casting 100, and shaft 102 also carries elongated electrically conducting insert 111 for registry with terminal screws 112 and 113 embedded in end cap 105. Shaft 102 has cut into its surface groove 114 to receive the lower end of plunger shaft 115 normally urged into engagement with 114 through expansion of spring 116 which bears at one end against shoulder 117 formed integrally with plunger shaft 115 and at the opposite end against centrally apertured cap 118 inserted in casting 100 at bearing opening 119, plunger shaft 115 riding therein as well as in smaller bearing opening 120. The left end of shaft 102, as viewed in Fig. 4, is aligned to abut shift lever 121 for counterclockwise movement of 121 when spring 122 bearing between piston 106 and end cap 105 is freed to expand. Shift lever 121 is pivotally attached to link 121' for connection to the steering column selector lever (not shown) for manual control.

Plunger shaft 115 passes through the fork opening 123 of one arm of bellcrank 124 pivotally mounted at 125 on casting 100 and is threaded to engage ball cap 126, casting 100 being attached to transmission 2 through bolts 127. The opposite arms of bellcrank 124 join pivotally to the vehicle accelerator (not shown), so that whenever the accelerator return spring (stronger than spring 116) returns bellcrank 124 to the dotted line position 124A, the accelerator idling position, plunger-shaft 115 will be lifted from groove cut 114, freeing shaft 102 for endward movement in a manner later to be described.

Shift lever 121 has formed adjacent its pivoting end a projecting stub arm 128, straight upon the upper face and cam-shaped from its free end to the underface.

A magnetically responsive plunger 129 is inserted in the core of the solenoid 130, and plunger 129 is normally projected from the core of the solenoid through the expansion pressure of spring 131 carried in the core of the solenoid, so that the free end of plunger 129 bears upon the lower pivotal end of shift lever 121 above stub arm 128.

In this projected position plunger 129 intercepts stub arm 128 when it is moved counterclockwise so that shift lever 121 cannot move into parking position. Shift lever 121 may be moved manually and freely from neutral position to reverse gear position when shaft 102 is in the position shown in Fig. 4, but plunger 129 must first be withdrawn from the counterclockwise path of movement of stub arm 128 before the shift lever 121 can be moved to the parking position.

Solenoid 130 is mounted on casting 100 by means of screws 132 and connects with terminal screws 133 and 134 at the two ends of its winding. Battery 135, grounded through lead 136, connects through short lead 137 to lead 138 which connects with terminal screw 112. Lead 139 connects terminal screw 113 to switch 140, while lead 141 connects switch 140 to starter 142 grounded through lead 143. In operation, when elongated insert 111 is shifted by movement of shaft 102 to register with terminal screws 112 and 113 the starter circuit is completed.

Battery 135 also connects through short lead 137 to lead 144 which in turn connects with terminal screw 109. Lead 145 connects terminal screw 108 with terminal screw 133 of solenoid 130, while lead 146 connects terminal screw 134 of solenoid 130 with terminal screw 147 which is embedded in electrically non-conducting block 148 inserted in the lower arm 149 of governor bracket 150 which is attached and grounded to transmission 2 by means of bolts 151. The upper arm 152 of bracket 150 has formed at its outer end bearing opening 153 for the acceptance of shaft 154 locked therein between threaded end cap 155 and spiral gear 156 firmly attached to shaft 154 below upper bracket arm 152. Upper arm 152 also carries bearing opening 157 (not shown, but indicated behind spiral gear 159) at right angles to opening 153 to accept shaft 158 terminating at one end in spiral gear 159 which engages spiral gear 156, Fig. 5, and terminating at its opposite end in a larger diameter section having a rectangular head (not shown) located behind transmission attaching collar 160 for connection to the customary speedometer take-off shaft in a manner similar to that shown in Fig. 1.

Shaft 154 is firmly joined at its lower end to governor housing 161, the circular top surface of 161 being conically concave and having four evenly spaced channels 162 formed thereunder projecting from the axial center to the periphery wherein four light weight electrically conducting balls 163 are encased behind plugs 164, balls 163 being free to roll in their respective channels 162, Fig. 5.

Governor housing 161 ends downwardly in stem 165, drilled perpendicular to the axial center of 161 and through the inner ends of channels 162 with opening 166, so that when shaft 154 is positioned in bearing 153 opening 166 will surround, without contacting, terminal screw 147, and the upper end of screw 147 will close the governor-solenoid circuit when governor housing 161 stops rotating and any one of the balls 163 settles at the inner end of one of the channels 162. Air port 167 communicates one end of cylindrical area 101 with the outside of casting 100, while threaded vacuum port 168 communicates the opposite end of area 101 with the outside of end cap 105 for connection to the manifold of the vehicle's motor.

In the operation of the mechanism so far described the mechanism in Fig. 4 is shown to be positioned under motor-operating conditions wherein vacuum from the manifold by way of a conduit to port 168 has caused piston 106 to compress spring 122 and move to end cap 105. In this cocked position bellcrank 124 is shown to be rotated counterclockwise from closed accelerator position 124A to a somewhat accelerator-opened position so that plunger shaft 115 has been pressed by spring 116 to engage at its lower end groove cut 114 in shaft 102, thereby holding piston 106 in the cocked position shown when bellcrank 124 is moved further counterclockwise to a full accelerator-opened position. With this arrangement when manifold vacuum drops off under heavy motor-load conditions, piston 106 will not move away from end cap 105.

Shift lever 121 is shown to have been manually moved from either parking or neutral position to low gear, and solenoid plunger 129 has dropped against the lower pivotal end of shift lever 121 above stub arm 128 to prevent return of the shift lever 121 to parking position. The balls 163 of governor housing 161 are shown to be held, Fig. 4, in channels 162 by centrifugal force away from terminal screw 147, indicating that the vehicle is in forward or backward movement and that the circuit of solenoid 130 is broken. In addition, the circuits of both solenoid 130 and starter 142 are broken by inserts 196 and 111 being out of contact with their respective terminal screws.

If, now, the motor stalls while the vehicle is in movement, the driver, through habit, will pump the accelerator and in so doing will momentarily release bellcrank 124 attached thereto to position 124A, whereupon plunger shaft 115 will be lifted from engagement with groove cut 114 and with the loss of manifold vacuum spring 122 will be free to expand, driving piston 106 away from end cap 105 to move shaft 102 and shift lever 121 as far as neutral position, solenoid plunger 129 blocking further progress to parking position. In the neutral position the circuit of starter 142 is completed through contact of elongated insert 111 with terminal screws 112 and 113, so that the motor of the vehicle will be immediately restarted in a safe out-of-gear position, restored manifold vacuum will move piston 106 to end wall 105, and the driver will need only to pull the selector lever under the steering wheel to an in-gear position to proceed on his way.

In the event the vehicle now comes to a stop while the starter 142 is still cranking the unstarted motor under the above motor-stalled conditions, at least one of the balls 163 of the now inactive governor housing 161 will roll down a channel 162 to close the circuit between grounded housing 161 and terminal screw 147. Since insert 196 has already closed the circuit between terminal screws 108 and 109, solenoid plunger 129 will immediately be drawn against spring 131 into solenoid 130, and stub arm 128, released from contact with plunger 129, will permit shaft 102 under tension of spring 122 to drive shift lever 121 to parking position. At this position insert 196 will have moved away from contact with the solenoid circuit screws 108 and 109 to break the solenoid circuit, and plunger 129 now will ride the cam-shaped surface of stub arm 128.

In the parking position elongated insert 111 will continue to contact terminal screws 112 and 113 so that starter 142 will continue to crank the motor until the motor becomes self-operating and vacuum develops in the manifold to move piston 106 to a cocked position adjacent end cap 105, in which position the starter circuit again is broken and the shift lever 121 may be manually moved to any in-gear position.

As a substitute for the mechanical governor parking control of Figs. 4 and 5 there is shown in Figs. 6 and 7 an hydraulic control for actuating the solenoid wherein the circuit of solenoid 130 is broken by pressure from an hydraulic pump operated by the vehicle driveshaft. The pump here shown is a gear type, but it may be a rotary vane or piston or another type of construction. Grounded housing assembly 169—171 carries in routed-out area 171 gear 172 meshing with gear 173 for the development of differential pressure between separate compartments 174 and 175 when the two gears are rotated in either direction. Shaft 176, which is formed integral with gear 172, rides in bearing openings 177 and 178 at threaded bosses 179 and 180, shaft 176 being shaped at one end to form a rectangular projection 181 for cooperation with the customary speedometer takeoff shaft from the vehicle driveshaft and recessed at the opposite end with rectangular area 182 to receive the rectangular end of the vehicle's speedometer cable. Oil lines 183 and 184 connect compartments 174 and 175 with oil reservoir area 185 in the upper end of housing 169—170. Cover 186, made of electrically nonconducting material, is shaped to cap housing assembly 169—170 and has formed at its center depending cylinder 187, the lower end of 187 clearing casting 169—170 to permit oil passage between the upper ends of oil lines 183 and 184 and reservoir area 185, there being formed at the upper edge of cylinder 187 port 188 communicating its interior with reservoir area 185.

A piston 189 of electrically non-conducting material, recessed at its core to ride loosely over finger 192 of casting 169—170, rides in cylinder 187 and is normally pressed downwardly by spring 190 to block the flow of oil between lines 183 and 184 and reservoir 185. Terminal screw 191, embedded in piston 189 and connected with the lower end of spring 190, contacts grounded casting assembly 169—170 at raised finger 192 above the oil level of reservoir area 185 so that a circuit is completed to terminal 193, connected with the upper end of spring 190 and embedded in cover 186, when the piston 189 rests on casting assembly 169—170. Airport 194 vents reservoir area 185 which is well filled with oil. Lead 146, connecting with solenoid 130 of Figs. 4 and 5, and connects at terminal screw 193 in Figs. 6 and 7. The sections 169 and 170 of housing assembly 169—170 are joined by bolts 195.

In operation, when shaft 176, geared to the vehicle's driveshaft, rotates gear 172 either clockwise or counterclockwise with the forward or backward motion of the vehicle, differential hydraulic pressure will develop between compartments 174 and 175. As a result, in seeking communication with reservoir area 185 oil from lines 183 or 184 will lift piston 189 into cylinder 187, compressing spring 190 and breaking the solenoid circuit between lead 146 and grounded casting assembly 169—170. Solenoid 130 will be deenergized and magnetic plunger 129 will be moved by spring 131 to obstruct the path of stub arm 128 against the counterclockwise movement of shift lever 121 into parking position, as long as the vehicle's rotating driveshaft creates differential pressure within pump housing assembly 169—170 to effect a broken solenoid circuit.

In addition to the method shown in Figs. 6 and 7 the circuit of solenoid 130 may be closed, when in neutral position, by the method shown in Fig. 13, so that shift lever 121 may be driven into parking position as soon as the vehicle stops moving. Small generator 300, held by bolts 301 to transmission 2 and operated by the driveshaft of the vehicle through the engagement of spiral gears 302 and 303, produces an electric current output whenever the shaft 304 in driving speedometer cable 305 at coupling collar 306 rotates with the forward or backward movement of the vehicle. A thermocouple switch arm assembly 307 composed of arm 308 and arm 309, is embedded in electrically non-conducting arms 310 and 311. Arm 310 carries electrically conducting plate 312 while arm 311 is anchored by bolts 324 to transmission 2 or a similarly stable section of the vehicle. Generator 300, grounded by lead 313, connects through lead 314 to terminal screw 315 on one end of arm 309, and terminal screw 316, which is mounted at the opposite end of arm 309, is grounded by lead 317. Arm 309 is constructed as a resistor to the flow of current so that when generator 301 is rotated due to either forward or backward movement of the vehicle, arm 309 will heat rapidly and in so doing will expand to curve about unheated arm 308 thereby moving electrically conducting plate 312 away from electrically conducting terminal screws 318 and 319. In the circuit of solenoid 130 terminal screw 318 is connected to battery 320 by lead 321, lead 322 grounding battery 320. Terminal screw 319 connects through lead 323 to terminal screw 109 bearing against piston shaft 102, as in Fig. 4. Terminal screw 108, also bearing against shaft 102, connects through lead 145 to terminal screw 133 on solenoid 130 which is grounded through terminal screw 134.

As in Fig. 4 when plunger shaft 115 is lifted from engagement with groove cut 114 and vacuum has disappeared from the vehicle's manifold, piston 106 will be driven toward shift lever 121 to close the solenoid circuit between terminal screws 108 and 109. As soon as gear 302 attached to the vehicle's driveshaft stops rotating and the current ceases flowing through resistor arm 309 of the thermocouple assembly 307, arm 309 will cool down to the atmospheric temperature and assembly 307 will curve downwardly to close the contacts between terminal screws 318 and 319. With the movement of shaft 102 stub arm 128 will be driven into contact with plunger 129 and shift lever 121 will be brought to neutral position. At the neutral position the circuit from battery 320 to solenoid 130 will be closed through the contact of terminal screws 108 and 109 with insert 196 in shaft 102, so that plunger 129 will be drawn into solenoid 130, and stub arm 128 in escaping contact with plunger 129 will permit shaft 102 to drive shift lever 121 to parking position where the circuit will again be broken by insert 196 moving from contact with terminal screws 108 and 109.

In Fig. 10 there is shown another form of the out-of-gear positioning and restarting mechanism wherein hydraulic pressures developed by the pumps within the automatic transmission itself are utilized to cock the out-of-gear positioning shaft, already described, and to shift a piston to block the movement of the shift lever into parking position.

A cylindrical casting 200, which may be carried externally of the transmission as an accessory, is here shown to be housed within transmission 2 and attached thereto by bolts 201 so that it is made an operable part of the transmission along with such other parts as gear train 2A shown to be partly revealed in another compartment of the transmission. Casting 200 has drilled at the axial center of cylindrical area 202 a bearing opening 203 to receive electrically non-conducting shaft 204. Electrically non-conducting end cap 205 is threaded to the open end of casting 200 and carries at its axial center bearing opening 206 for the opposite end of shaft 204. Shaft 204 at shoulder 207 is threaded to receive piston 208 on the rim of which rides piston ring 209 snapped into groove 210 for contact with cylindrical area 202. Shaft 204 at one point on its surface has embedded therein electrically conducting insert 211 for registry with terminal screws 212 and 213, and has at another point elongated groove cut 214 for cooperation with piston rod 215 riding perpendicular thereto in bearing opening 216 of end cap 205. Opening 216 enlarges at its upward end into cylindrical area 217 in which rides piston ring 218 snapped into rim groove 219 of piston 220 which is threaded to the upper end of piston rod 215. A spring 221 bears against the lower wall of area 217, carrying a port 222, and against the undersurface of piston 220. End cap 223 threads into the upper end of cylindrical area 217, and has put through its axial center port 224 threaded to receive tubing 225 connecting with the customary driveshaft driven rear pump 226 of the automatic transmission 2, said pump being of the variety that will produce a pressure when the driveshaft rotates either clockwise or counterclockwise and shall produce at least a moderate pressure in tubing 225 under very low vehicle speed conditions, preferably ½ mile per hour or less.

L-shaped port 228 in casting 200 at the end opposite to end cap 205 communicates with cylindrical area 202 and is threaded to connect with tubing 229 joined to the customary motor driven front pump 230 of the automatic transmission 2, said pump producing a pressure in tubing 229 as soon as the motor becomes self-operating. Battery 231, grounded through lead 232, connects through lead 233 to starter 234, lead 235 connecting starter 234 to ignition switch 236, and lead 237 connecting ignition switch 236 with terminal screw 212, terminal screw 213 being grounded through lead 238.

A spring 239 bears between the upper surface of piston 208 and the inner surface of end cap 205. A port 240 communicates the inner and outer surfaces of end cap 205 to connect either by tubing or directly with the oil reservoir area of transmission 2, port 222 being arranged in the same manner. As with the shift lever shafts in Figs. 1 and 4, the shaft 204 is aligned to abut shift lever 241, connected externally through link 241', here shown in broken lines, to the steering column mounted manual selector lever (not shown).

In the operation of the mechanism so far described, it is obvious that the motor of the vehicle is in operation as evidenced by the fact that the front pump 230 has forced oil through tubing 229 into cylindrical area 202 behind piston 208 to compress spring 239 and move shaft 204 to the right end limits of its travel so that it has been possible for the driver to manually position shift lever 241 in reverse. It is also obvious that the vehicle is moving backward as evidenced by the fact that rear pump 226 has forced oil through tubing 225 into the upper section of cylindrical area 217 behind piston 220 to compress spring 221 and move shaft 215 into engagement with elongated groove 214 to prevent ejection of shift lever 241 by shaft 204 into parking.

If, now, the motor stalls while the vehicle is moving backwardly, pressure from the front pump 230 in tubing 229 will disappear and spring 239 will be free to drive piston 208 and shaft 204 away from end cap 205, moving shift lever 241 as far as neutral position at which location electrically conducting insert 211 closes the starter circuit between terminal screws 212 and 213 for immediate cranking and restarting of the motor and subsequent return of piston 208 to cap 205, whereupon shift lever 241 will be freed for manual return to an in-gear position. If the vehicle stops moving before the motor has been restarted, pressure from rear pump 226 will disappear and spring 221 will be free to lift shaft 215 from engagement with groove cut 214, permitting spring 239 to move piston 208 and shaft 204 to the leftward limits of their travel, thereby forcing shift lever 241 into parking position. Since insert 211 is long enough to continue contact with terminal screws 212 and 213, the starter 234 will continue cranking the motor until the motor is restarted whereupon piston 208 will again be moved toward cap 205 and the starter circuit will be broken so that shift lever 241 may again be manually moved to an in-gear position. Instead of pump 230, the oil pump of the motor, the water pump, or the like, producing fluid pressure only while the motor is in operation, may be substituted.

At any time the ignition switch 236 is turned to "off" the shift lever 241 will, after the motor stops, be ejected, if in-gear, to neutral, and after the vehicle stops moving it will be moved to parking. In either neutral or parking position, when the ignition switch 236 is turned to "on," the motor will again be started and shift lever 241 will be freed for manual in-gear positioning.

Where the rear pump of an automatic transmission develops an output pressure only when the vehicle moves forwardly, a separate pump capable of developing an output pressure when the vehicle moves either backwardly or forwardly, such as the pump shown in Figs. 8 and 9, may replace pump 226 of Fig. 10 to operate shaft 215. As shown in Fig. 8, the sections of pump housing 250—251, only one of which, 250, is shown, are held together as a unit by bolts 252 running therethrough. As with gear 172 of Figs. 6 and 7, gear 253 is formed integrally with a shaft connecting to one end with the speedometer takeoff shaft of the vehicle's driveshaft and at the other end with the speedometer shaft, so that when rotated in either direction by the rotation of the vehicle's driveshaft gear 253 will rotate gear 276 and a differential pressure will develop between compartments 254 and 255. Oil will thus be forced through tubing 256 and 257 to the upper end of cylindrical area 217 of Fig. 10. In this construction end cap 258, formed by the lower threaded stub ends of housing 250—251 and having connecting tubing 256 and 257, is here used to substitute for end cap 223, and piston 259, piston ring 260, and groove 261, now substitute for piston 220, ring 218 and groove 219.

The upper face of piston 259 carries upwardly projecting lateral slot 262, with shallow cross slot 263 communicating the faces of lateral slot 262. End cap 258 carries lateral groove 264 for the reception of slot 262, and end cap 205 of Fig. 10 now carries at point 265 connection with tubing 266 joining at its upper end at point 267 to reservoir area 268 of pump housing 250—251. Compartments 254 and 255 connect with reservoir area 268 via ports 269 and check ball housing areas 270 in which areas are carried check balls 271 above springs 272, threaded and apertured insert plugs 273 cooperating with the upper ends of areas 270. A cover 274 with vent port 275 fits over the top of casting 250—251, reservoir area 268 being well filled with oil.

In operation, when the vehicle moves either forwardly or backwardly so that the driveshaft rotates pump gears 253 and 276, a differential pressure will develop between compartments 254 and 255, and oil under pressure will move piston 259 downwardly to compress spring 221 and engage shaft 215 with groove cut 214, as already explained for the construction shown in Fig. 10. Lateral slot 262 in moving downwardly exposes cross slot 263 to the pressure from either tubing 256 or 257, permitting the oil under pressure to escape to tubing 266 and back to the reservoir area 268 only after piston 259 has been projected downwardly for full engagement with groove cut 214 thereby assuring immediate and sensitive response to even light pressures in tubing 256 or 257. Low pressure oil may return to the compartment 254 or 255 by way of either one or the other of the tubes 256 or 257 under low pressure, depending on the rotational direction of gears 253 and 276, or may return to either compartment from reservoir area 268 by unseating one or the other of check balls 271.

When the vehicle comes to a stop or a near-stop and gears 253 and 276 cease or almost cease rotating, cross slot 263 will permit spring 221 to lift piston 259, at first rapidly until cross slot 263 passes completely into cut 264, then more slowly due to the restriction of oil flow through slot 264, providing a timing and delaying action before the lower end of shaft 215 can escape groove cut 214, an arrangement which guarantees full stopping of the vehicle before shift lever 241 is moved to parking position.

If the shift lever is made to move automatically to parking at any minimum selected speed, as ½ mile per hour, some strain will be thrown to the driveshaft. To minimize this strain a parking gear 280 is shown in Figs. 11 and 12 to ride freely at its hub 281 on driveshaft 282. Parking pawl 283 is pivoted at 284 in transmission housing 2 and restrained from engagement with gear 280 by spring 285 connected with housing 2. Cam 286, attached to shift lever 241, moves parking pawl 283 into engagement with gear 280 when shift lever 241 is moved to parking. Driveshaft 282 carries attached arms 287 whose right angled ends 288 project into radial slots 289 cut through the walls of parking gear 280. Springs 290 and 291 are inserted in slots 289 and are formed at their ends to grip right angled arm ends 288 and the limits of slots 289.

In operation when shift lever 241 is moved to parking position, parking pawl 283 will securely engage several of the teeth of gear 280, due to the rotation of cam 286 by the shift lever. In the event the driveshaft is rotated clockwise at a slow rate and is not yet fully stopped, the right angled ends 288 of arms 287 will compress springs 290 which lie between ends 288 and the limits of radial slots 289. If the driveshaft is rotating counterclockwise, ends 288 of arms 287 will compress springs 291 which lie between ends 288 and the opposite end limits of radial slots 289. As a result, the action of parking pawl 283 will be cushioned whether the vehicle is moving forwardly or backwardly and it will be brought to a stopped and a locked condition without strain on the moving parts.

Figure 15:
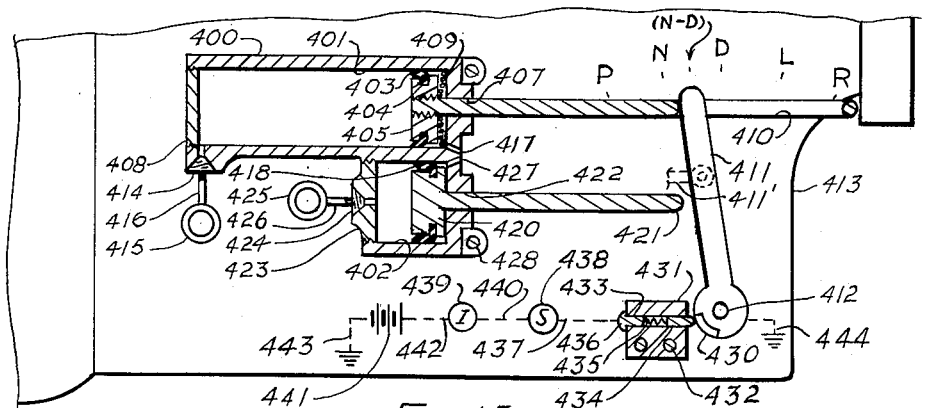
Fig. 15 is a sectional view of the hydraulically actuated form (shown active) of the device in Fig. 14, with the starter control switch shown to be open.
Figure 16:
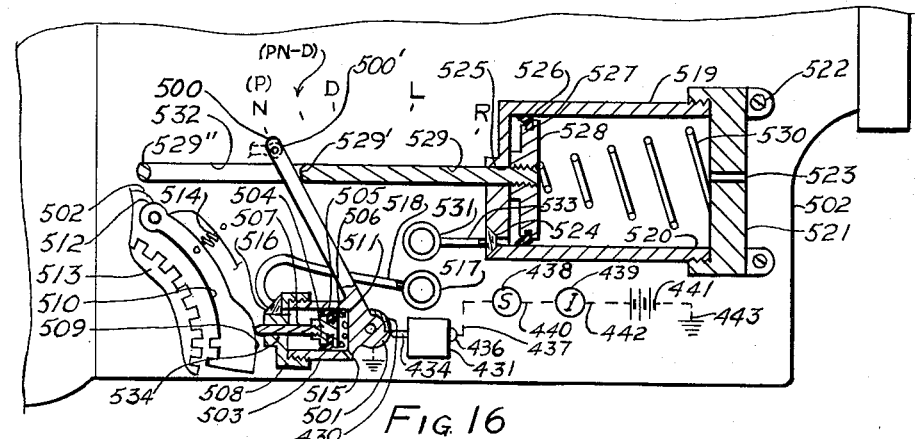
Fig. 16 is a sectional view of a hydraulically actuated form of the out-of-gear positioning device wherein neutral and parking conditions both occur when the shift lever is moved to a single out-of-gear position.

While the foregoing views show a latch for locking the shift lever against movement to parking position, Figs. 14, 15, and 16 show fluid pressure methods for directly resisting such movement to parking, thereby eliminating the need for the latch.

In Fig. 14 there is shown hydraulic piston housing 400 containing cylindrical areas 401 and 402. Piston ring 403, mounted in groove 404 of piston 405, rides in cylindrical area 401 and carries at its axial center threaded piston rod 406 which projects through bearing opening 407 of housing 400. Piston 405 is pressured toward cap 408 threaded to the open end of cylindrical area 401, spring 409 bearing between piston 405 and the inner end of cylindrical area 401. Piston rod 406 is cut with elongated slot 410 to frame the upper end of shift lever 411 which pivots at 412 in transmission 413. Port 414, communicating through housing 400 with the outer end of cylindrical area 401, connects with the motor driven pump 415 of the vehicle by way of tubing 416. Port 417 communicates the inner end of cylindrical area 401 with the outer surface of housing 400. Link 411' connects with the selector lever.

Piston ring 418, mounted in groove 419 of piston 420, rides in cylindrical area 402 of housing 400. A piston rod 421 is formed integrally with piston 420 and projects through bearing opening 422 of housing 400 to abut shift lever 411 above its pivotal point 412. End cap 423 threading into the open end of cylindrical area 402 has formed therein hydraulic port 424 to connect cylindrical area 402 with driveshaft driven hydraulic pump 425 by way of tubing connection 426. The inner end of cylindrical area 402 has port 427 to connect said inner end with the outer surface of housing 400. Housing 400 is secured to transmission 413 by means of bolts 428. While housing 400 is shown to be mounted on the outer surface of transmission 413 as an accessory, it should be noted that it may be made integral with transmission 413 and may be built within the transmission in a manner similar to the out-of-gear positioning unit shown in Fig. 10.

Along with the usual dash mounted, manually operated starter switch, automatic transmissions generally employ a starter circuit closing switch which permits starter operation only when the selector lever is moved to neutral or park position. By bridging the dash mounted switch to eliminate it from the circuit, the out-of-gear positioning device may be made to automatically operate the starter through the circuit closing switch alone when it moves the selector lever to neutral or park.

Moreover, in withdrawing from the selector lever, when the motor starts, the device may be made to move the selector lever slightly toward, but without entering, an in-gear position to open the switch and break the starter circuit. With this arrangement, therefore, the cost of a circuit closing switch as a part of the device may be eliminated.

In the event this device is to be built into the transmission of the vehicle the circuit closing switch may be located within or upon the transmission to cooperate with the shift lever of the transmission in a manner shown in Figs. 14, 15 and 16, so that the starter may be controlled, both for engagement and disengagement, by a single switch which, in addition, will permit such starter operation only when the selector lever, and consequently the shift lever, is in an out-of-gear position.

In the latter case shift lever 411 at its lower pivotal end 412 is recessed to receive electrically non-conducting curved section 430. An electrically non-conducting block 431 is mounted on transmission 413 by means of bolts 432 and receives a cylindrical opening 433 electrically conducting finger 434 and spring 435 for contact with terminal pin 436 held frictionally in one end of cylindrical opening 433. Through lead 437 pin 436 connects with starter 438. Starter 438 and ignition switch 439 are connected by lead 440 while switch 439 and battery 441 are connected by lead 442, lead 443 grounding battery 441. Shift lever 411 is shown to be grounded to transmission 413 through lead 444.

In the operation of the mechanism so far described, the automatic out-of-gear positioning mechanism, as shown in Fig. 14, has positioned shift lever 411 at neutral, the motor of the vehicle having stopped as evidenced by the fact that pump 415 is not providing hydraulic pressure to compress spring 409. In the positioning shown in Fig. 14 it is also evident that the vehicle is moving since hydraulic pressure delivered by driveshaft driven pump 425 is holding piston rod 421 firmly against shift lever 411. In this position slotted piston rod 406 has rotated shift lever 411 counterclockwise to neutral position so that finger 434 has been brought into electrical as well as physical contact with the pivoting end 412 of shift lever 411, and in the event the ignition switch 439 is turned to "on" the starter will operate to restart the motor. In the event the ignition switch 439 is turned to "off," the starter will not operate so that as soon as the vehicle stops moving hydraulic pressure in cylindrical area 402 behind piston 420 will drop to permit spring 409 to fully expand and move shift lever 411 counterclockwise to parking position.

Assuming now that the ignition switch 439 is turned to "on" and that the motor of the vehicle is restarted through action of starter 438, hydraulic pressure developed by motor driven pump 415 will drive piston 405 toward bearing opening 407 to compress spring 409. In this movement shift lever 411 will remain in parking or neutral position until the end limit of cut 410 contacts its upper free end, whereupon shift lever 411 will be moved to a position between neutral and drive, indicated as N–D where insert 430 adjacent pivoting point 412 of shift lever 411 will be rotated to contact finger 434 to break the starter circuit. In this position (Fig. 15) shift lever 411 will continue to be in an effective neutral position and not engaged with Drive. In the event the motor again stops shift lever 411 will again be moved counterclockwise to neutral to again complete the starter circuit, as in Fig. 14, and will, if the vehicle is not moving, be rotated to parking position where the starter circuit will remain completed until the motor is restarted and shift lever 411 is once more moved in a clockwise direction to the position N–D shown in Fig. 15.

In Fig. 16 there is shown an automatic out-of-gear positioning mechanism which, in combination with a piston positioning shift lever, permits the driver to ignore completely the problem of locking the vehicle against movement. With the shift lever shown, when the steering column mounted selector lever is moved manually to the neutral position, the transmission will, as soon as the vehicle stops moving, be shifted to a locked parking condition so that a separate parking location for the selector lever becomes unnecessary and the neutral position on the steering column quadrant may be marked PN to indicate that both conditions are made to occur at the same location. Link 500' connects with the selector lever.

With the addition of the automatic out-of-gear positioning mechanism shown in Fig. 16 the shift to neutral upon failure of the motor, and the further shift to parking upon stopping of the vehicle may be accomplished without effort or thought on the part of the driver. With the further addition of the switch block 431 and its cooperating parts, as shown in detail in Figs. 14 and 15, the shift lever not only may be automatically moved to neutral and parking, but may also be made to automatically start the vehicle's motor in the manner described for Figs. 14 and 15.

To accomplish the foregoing a shift lever 500, pivoting at hub 501 to cooperate with the output control valves and linkages of an automatic transmission 502 carries piston cylinder housing 503 adjacent its hub 501 and integrally formed therewith for piston 504 riding therein. Piston ring 505 snaps into groove 506 cut in the rim of piston 504, and piston 504 receives at its center threaded rod 507, which projects through the center bearing opening 534 of threaded end cap 508 to align with raised shoulder 509 of parking pawl 510 for contact therewith. Rod 507 is urged by confined spring 511 toward parking pawl 510, and parking pawl 510 pivoting at transmission support 512 is normally held from engagement with parking gear 513 by the spring 514 in the same manner as the parking pawl shown in Fig. 11. Cylinder housing 503 has air port 515 at its inner end and end cap 508 has threaded hydraulic port 516 for connection to the driveshaft operated pump 517 through flexible hose 518.

In operation when the driver manually moves the shift lever 500 to the neutral position, as shown in Fig. 16, piston rod 507 is swung into contact with cam shoulder 509 of parking pawl 510. In Fig. 16 pump 517 is shown to be in operation and the vehicle to be in motion as evidenced by the delivery of hydraulic pressure to cylinder 503 wherein piston 504 has been moved toward hub 501 of shift lever 500 to compress spring 511. As soon as the vehicle stops moving, pressure output of pump 517 will stop so that spring 511 will be free to expand and drive piston rod 507 and parking pawl 510 toward gear 513 to overcome weaker spring 514 and thereby engage parking pawl 510 with parking gear 513 to lock the vehicle against forward or backward movement.

To bring the shift lever 500 to park-neutral position automatically whenever the motor stops, a hydraulically actuated neutral positioning assembly is added. Cylinder housing 519, having cylindrical opening 520, threads into end cap 521 mounted against transmission 502 by means of bolts 522. An air port 523 is incorporated in end cap 521 while a threaded hydraulic port 524 is incorporated in the closed end section of cylinder 519 along with central bearing opening 525. Piston ring 526, snapped into groove 527 of piston 528, rides in cylindrical area 520, piston 528 being threaded at its center to receive piston rod 529. Spring 530 bears at one end against piston 528 and at the opposite end against end cap 521. Piston rod 529, terminating at rounded extremity 529', is aligned to bear against a side portion of shift lever 500. Motor driven pump 531 connects with port 524 by way of tubing 533 so that as soon as the vehicle motor becomes self-operating piston 528 will move from the position shown in Fig. 16 toward end cap 521 to compress spring 530 and free shift lever 500 for manual in-gear positioning. When the motor again stops, spring 530 expands to drive shift lever 500 to the neutral position where the vehicle will be locked into parking with the stopping of the vehicle's movement.

To provide automatic restart with this arrangement piston rod 529 is made to terminate at 529″ instead of at 529′ and to carry slot 532 wherein the upper end of shift lever 500 is caged. The electrically non-conducting insert 430 of Figs. 14 and 15 is now added to hub 501 of shift lever 500 along with finger 434, block 431 and the other components of the starting circuit shown in Figs. 14 and 15, so that when the ignition switch 439 is in an "on" position and shift lever 500 is moved automatically to neutral by piston rod 529, the motor will automatically restart. Hydraulic pressure within cylinder 519 will then shift piston 528 to end cap 521, and shift lever 500 will be moved from neutral position, marked (P)N, to position (P)N–D to bring insert 430 in hub 501 of shift lever 500 into contact with finger 434 and break the starter circuit.

Figure 17:
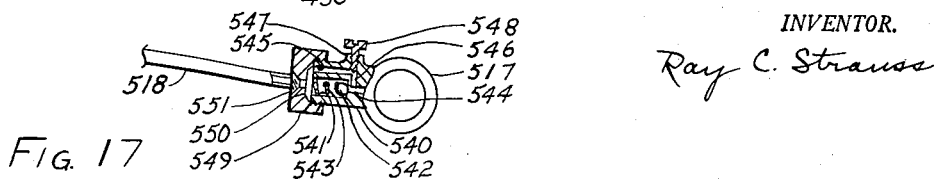
Fig. 17 is an enlarged fragmentary cross sectional view of the hose 518 and pump 517 of Fig. 16 with a check valve inserted therebetween.

In order to delay the expansion of spring 511 in Fig. 16 when driveshaft driven pump 517 ceases to deliver hydraulic pressure through flexible hose 518, a check valve housing 540, integral with pump 517, is shown to be added in Fig. 17. From its open end housing 540 is drilled with cylindrical area 541 to receive check ball 542 and spring 543, check ball 542 seating against one end of port 544 which connects cylindrical area 541 with pump 517. Port 545 parallels area 541 in housing 540 and terminates at its inner end at cross port 546 drilled through boss 547 in housing 540 to interconnect ports 545 and 544. Boss 547 is threaded to receive setscrew 548 which may be adjusted to restrict the hydraulic flow between ports 545 and 546. End cap 549 is recessed and threaded to cooperate with the projecting end of housing 540, and is further recessed at 550 to intercommunicate the outer ends of cylindrical area 541 and port 545. Port 551 is drilled between the inner and outer faces of end cap 549 and is threaded to connect with flexible hose 518.

In operation, when the vehicle driveshaft is rotated, fluid under pressure passes from pump 517, by way of port 544 and through ports 546 and 545, to hose 518 at a restricted rate of flow due to the restriction caused by setscrew 548. Fluid under this pressure also passes from pump 517 by way of port 544 through cylindrical area 541 to hose 518 at a less restricted rate of flow due to the fact that check ball 542 is easily unseated from the end of port 544. As soon as the pump ceases to deliver fluid under pressure to hose 518, check ball 542 again seats on the end of port 544 so that fluid returning from hose 518, via port 544 and pump 517 to the reservoir of the transmission, as spring 511 expands against piston 504, must pass at a restricted rate through ports 545 and 546. If pump 517 ceases to deliver pressure at, say, ½ mile per hour vehicle speed and the pressure drop permits a reverse flow from hose 518 toward pump 517, then under this condition spring 511 will expand slowly allowing the vehicle time to complete its deceleration and come to a complete stop before parking pawl 510 is made to engage parking gear 513. It should be observed that check valve housing 540 and its components may also be adapted for use with the constructions shown in Figs. 6, 7, 8, 10, 14, 15 and 19, where engagement of the parking pawl with the driveshaft is likewise actuated through a driveshaft driven hydraulic pump.

In the disclosures of my invention here set forth it will be noted that there are methods shown for directly holding the shift lever against movement to parking; for holding the device against moving the shift lever to parking, and for holding both the shift lever and the device against moving the shift lever to parking.

Various methods are likewise shown in both this application and my copending application for Letters Patent of the United States, filed October 8, 1951, Serial Number 250,334, for withdrawing and holding the device from resilient contact with the shift lever while the motor of the vehicle is operating. To one practiced in the art it will be evident that further innovations and combinations of these disclosures are possible without departing from the spirit of the invention. For instance, while Fig. 1 of this application shows a solenoid 35 for holding shaft 6 in a withdrawn position when vacuum pressure drops with an increase of load on the motor, substitute methods such as those shown in Figs. 18, 19 and 20 can be used.

Figure 18:
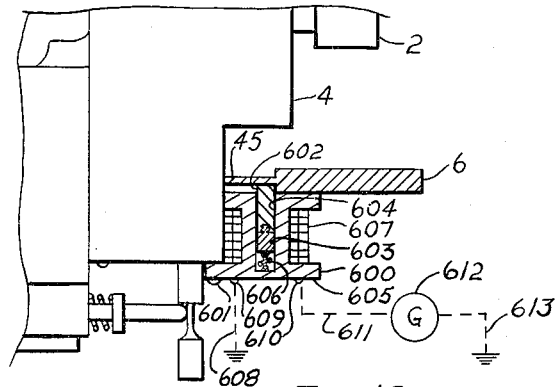
Fig. 18 is a fragmentary elevational view of the vacuum operated, governor controlled device of Fig. 1 with a solenoid operated, neutral positioning control added and shown in cross section.

In Fig. 18, for example, a solenoid assembly 600 is mounted on casting 4 of Fig. 1 by way of bolts 601, casting 4, in turn, being mounted on transmission 2 by way of bolts 5, not shown. With the motor running and shaft 6 in a withdrawn position so that cut 45 is exposed from casting 4, as shown in Fig. 18, plunger 602 is aligned to engage cut 45 at its exposed end limit. Plunger 602 and soft iron solenoid core 603, threaded thereto, ride in bearing opening 604 at the axial center of solenoid frame 605 when the motor is not operating. These are normaly urged by contracting spring 606, engaging core 603 and the lower closed end of bearing opening 604, toward said lower closed end. Solenoid coil 607 is grounded by lead 608 at terminal 609 and connects at terminal 610 through lead 611 with vehicle generator 612 which is grounded by lead 613. In operation, when the motor is operating, generator 612 produces a current to flow through coil 607 to continually urge solenoid core 603 and plunger 602 toward cut 45 so that the exposed end of shaft 6 is locked against movement toward casting 4 when vacuum pressure drops, this locking engagement continuing until the motor again stops and the current from generator 612 ceases to flow.

Figure 19:
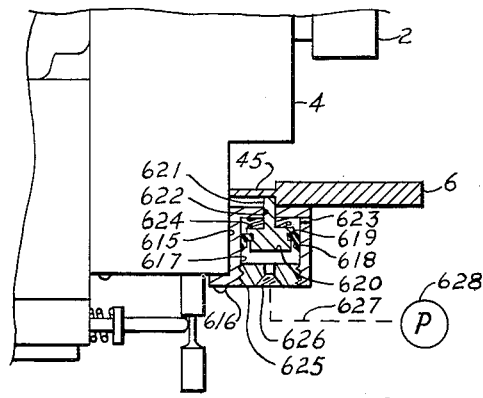
Fig. 19 is a fragmentary elevational view of the device of Fig. 1 with a hydraulically operated, neutral positioning control added and shown in cross section.

In Fig. 19 a hydraulic method is shown for locking the vacuum withdrawn piston shaft 6 against movement toward casting 4 when the motor is running and vacuum pressure varies. Cylinder housing 615 is mounted on casting 4 by way of bolts 61. Cylindrical area 617 carries a piston ring 618 snapped into groove 619 of piston 620. Piston rod 621, integral with piston 620, passes through opening 622 for engagement with cut 45 when rod 6 of Fig. 1 is in a withdrawn, motor operating position. An air port 623 communicates the upper end of cylindrical area 617 and the outer surface of cylindrical housing 615. A spring 624, bearing between the upper end surface of area 617 and piston 620, normally pressures piston 620 to seat on end cap 625, threaded into the lower open end of cylindrical area 617, when the motor is not running. End cap 625 carries threaded port 626 for connection via conduit 627 with a motor driven pump 628, such as the oil pump, the water pump, or the like. In operation, when the motor is running, fluid pressure from motor driven pump 628 against the lower surface of piston 620 compresses spring 624 to engage piston rod 621 with cut 45 thereby preventing movement of shaft 6 toward casting 4 until the motor stops and the pressure against piston 620 fades.

Figure 20:
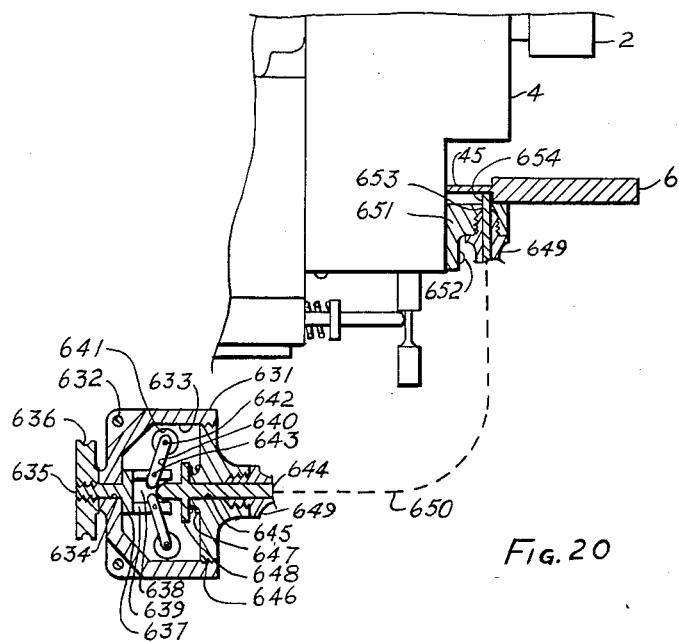
Fig. 20 is a fragmentary elevational view of the device of Fig. 1 with a governor operated, neutral positioning control added and shown in cross section.

In Fig. 20 a governor method is shown for locking withdrawn shaft 6 against movement toward casting 4. Governor housing 631 is secured to the motor of the vehicle, preferably for operation by the fan belt, by means of bolts 632. Area 633 receives in bearing opening 634 at its axial center a shaft 635, the outwardly projecting extremity of which is threaded to engage motor driven pulley 636. The opposite inner end of shaft 635 flares into collar 637 which is cored with opening 638 and slotted with slots 639. Governor arms 640 carry weights 641 at 642 and pivot at 643 in slots 639 of collar 637, their inner ends projecting into core opening 638 for contact with one end of pin 644 riding therein. Pin 644 at its opposite end projects through opening 645 of end cap 646 threaded into the open end of area 633. A spring 647, bearing between end cap 646 and a collar 648, integral with and formed at one point on the surface of pin 644, normally pressures to hold pin 644, when the motor is not operating, against the arms 640.

Flexible shaft housing 649, threadably engaging the outer end of end cap 646 at its axial center, encases flexible shaft 650 which is firmly attached to the end of pin 644. The opposite end of housing 649 threadably engages bracket 651, mounted on casting 4 by bolts 652, at opening 653 wherein pin 654, firmly attached to the end of flexible shaft 650, rides for endward movement to engage cut 45 of shaft 6. In operation when the motor is running collar 637 is rotated to extend governor weights 641 by centrifugal force to their operational limits, as shown in Fig. 20, so that the inner ends of arms 640 press to compress spring 647, and through pressure on pin 644 and flexible shaft 650 to seat pin 654 in cut 45 against movement of shaft 6 toward casting 4 until the motor stops and spring 647 operates to withdraw pin 654 from engagement with cut 45.

While governor, electrical, and pressure changing parking control methods are shown in this application for detecting lack of movement in a vehicle, other such detecting methods may be employed equally as well and may be substituted for use with the neutral positioning devices shown. Where pumps are employed, as in Figs. 6, 7, 10, 14, 16 and 19, pressure relief valves may be added so that the hydraulic load on the driving mechanism may be relieved above the needed minimum, and where a current is set up by the movement of the vehicle or operation of the motor, as in Figs. 1, 13, and 18, current shunting or flow control means may be inserted in the circuit to regulate the output of the generator therethrough.

It will be seen that my invention may be embodied in other specific forms without departing from its spirit or essential chaarcteristics. The present embodiments, as here set forth, therefore, are considered in all respects as illustrative and not restrictive, the scope of my invention being indicated by the appended claims rather than by the foregoing description, and all changes which may come within the meaning and range of equivalency of the claims are therefore intended to be embraced therein.

What is claimed is:

1. A safe starting device for a vehicle having a driveshaft to drive the vehicle wheels, and having a power receiving transmission for transmitting power to said driveshaft, said transmission controlled by the movement of a selector so that when selector is in a first position said transmission is operative to transmit power, when selector is in a second position said transmission is inoperative to transmit power, and when selector is in a third position said transmission is inoperative to transmit power as well as locked along with the driveshaft of the vehicle to prevent rotation of the vehicle's driven wheels, comprising a movable member, said member being adapted to drive and control said selector, first means responsive to the stopping of the motor for moving the member into driving engagement with the selector whereby said means drives the selector through said member, second means responsive to operation of the motor for moving the member out of driving engagement with the selector whereby the selector may be moved independently of said member, third means for controlling the path of joint member and selector movement by said first means and including a block element for positioning said selector in said second position, and a fourth means responsive to stopping of the vehicle for withdrawing said block element from its selector positioning location, so that said first means will move said member to drive said selector to said third position.

2. In a vehicle having a motor and an automatic transmission with a manually operated selector lever movable to in-gear and out-of-gear positions, including a "park" position, the combination of a movable plunger resiliently urged to move the selector lever from an in-gear to an out-of-gear position, means operative during operation of the motor for moving and holding said plunger in position wherein the selector lever may be moved manually, solenoid means, speed responsive means controlling said solenoid means and responsive to the movement of the vehicle for preventing the plunger from moving the selector lever to a "park" position, said solenoid means responsive to the stopping of the vehicle for permitting the plunger to be urged to move the selector lever to a "park" position, said solenoid means including a latch for locking said plunger against movement to "park" position, said latch being retractible for release of said plunger, a circuit for operating said solenoid means, unconnected terminals in said circuit so that circuit is normally open, a circuit closing element carried by said speed responsive means responsive to the movement of the vehicle wherein said element opens said circuit at said unconnected terminals when the vehicle moves and closes said circuit at said unconnected terminals when the vehicle stops.

3. In a vehicle having a motor and an automatic transmission with an operator movable to in-gear and out-of-gear positions including a "park" position and having a primary fluid pressure pump responsive to the operation of the motor as well as a secondary fluid pressure pump responsive to the movement of the vehicle, the combination of a fluid operated member connected to the operator and resiliently urged to move the operator from an in-gear to an out-of-gear position, fluid passage means connecting the member to said pumps, said primary pump during operation of the motor producing fluid pressure acting to hold said member in position wherein the operator may be moved, said secondary pump during movement of the vehicle producing fluid pressure to prevent the member from moving the operator to a "park" position.

4. In a vehicle having a motor and an automatic transmission with an operator movable to in-gear and out-of-gear positions, including a "park" position, the combination of a fluid pressure operated plunger connected to the operator and resiliently urged to move the operator from an in-gear to an out-of-gear position, means active during operation of the motor for holding said plunger in position wherein the operator may be moved manually, speed responsive means responsive to the movement of the vehicle for preventing the plunger from moving the operator to a "park" position, said speed responsive means being responsive to the stopping of the vehicle for permitting the plunger to be resiliently urged to move the operator to a "park" position, said speed responsive means including a first disc rotated by the driveshaft of the vehicle, a second disc frictionally engaging said first disc, said second disc being slidable on its axle and normally engaging said first disc adjacent its periphery, said speed responsive means including a governor unit, said second disc projectable toward the hub of said first disc through the accelerating movement of said unit so that said governor unit is quickly responsive to initial rotation of said first disc for rapid projection toward its hub by said second disc, and said governor unit is slowly responsive to the final rotation before stopping of said first disc to effect slow retraction of said second disc from the hub of said first disc, preventing movement of said plunger to a "park" position until said driveshaft has decelerated in rotational movement to the point of stopping.

5. A safe starting device for a vehicle having a driveshaft to drive the vehicle wheels, and having a power receiving transmission for transmitting power to said driveshaft, said transmission controlled by the movement of a selector so that when selector is in a first position said transmission is operative to transmit power, when selector is in a second position said transmission is inoperative to transmit power, and when selector is in a third position said transmission is inoperative to transmit power as well as locked along with the driveshaft of the vehicle to prevent rotation of the vehicle's driven wheels, comprising a movable member, said member being adapted to drive and control said selector, first means responsive to the transition of the motor between operating and non-operating conditions for moving the member into driving engagement with the selector whereby said means drives the selector through said member, second means responsive to operation of the motor for moving the member out of driving engagement with the selector whereby the selector may be moved independently of said member, and third means responsive to movement of the vehicle for controlling the path of joint member and selector movement wherein movement of the selector to said third position is prevented as long as the vehicle is moving.

6. In a vehicle having a motor, the combination of a power transmission adjustable to transmit power and not to transmit power, a parking pawl operative to lock the vehicle against movement, a device operatively connected to said pawl for actuating said pawl when the vehicle stops moving, a movable control member to adjust said transmission to at least one position for the transmission of power, and to one position only for non-transmission of power while coincidentally adjusting said device for a position of actuation, said device comprising a housed piston for effecting said locking action and including a spring bearing between one face of said piston and one interior end of said housing, means providing a relatively unrestricted connection of the opposite face of said piston with a source of fluid pressure developed by movement of the vehicle in order to compress said spring and withdraw said device from acting on said parking pawl, and means providing a relatively restricted connection with said fluid pressure source to delay expansion of said spring so that said vehicle in continuing deceleration, if said fluid pressure ceases slightly prior to the stopping of the vehicle, will have opportunity to come to a full stop before said parking pawl locks said vehicle against movement.

7. In a vehicle having a motor, the combination of a power transmission adjustable to transmit power and not to transmit power, a parking pawl to lock the vehicle against movement, a device operatively connected to said pawl for actuating said pawl when the vehicle stops moving, a movable control member to adjust said transmission to transmit power, to adjust said transmission to not transmit power, and to adjust said transmission to not transmit power while coincidentally adjusting said device for a position of actuation, said device comprising a housed piston effecting said locking action and including a spring bearing between one face of said piston and one interior end of said housing, means providing a relatively unrestricted connection of the opposite face of said piston with a source of fluid pressure developed by movement of the vehicle in order to compress said spring and withdraw said device from acting on said parking pawl, and means providing a relatively restricted connection with said fluid pressure source to delay expansion of said spring.

8. In a control device for a motor powered vehicle having an automatic transmission with an operator for positioning said transmission in out-of-gear and in-gear positions, the combination of first means operatively connected to said operator for moving it to an out-of-gear position and holding it in such position until the means becomes inoperative, second means responsive to and operative during operation of the vehicle motor for making the first means inoperative, and third means connected to and operating the first means to move said operator to an out-of-gear position when the second means is inoperative, said second means acting to release said first means when the motor stalls and to render said first means inoperative when the motor is restarted.

9. In a control device for a motor powered vehicle having an automatic transmission with an operator for positioning said transmission in forward or reverse drive positions, the combination of first means for operative connection to said operator to block its movement to reverse drive position, second means responsive to forward movement of the vehicle above a predetermined speed for operating the first means, and third means making said first means inoperative when said speed falls below said predetermined forward speed so that said operator can be moved to a reverse position.

10. In a control device for a motor powered vehicle having an automatic transmission with an operator for positioning said transmission in parking or drive positions, the combination of first means for operative connection to said operator to block its movement to parking position, second means responsive to movement of the vehicle for operating the first means, and third means making said first means inoperative when said vehicle has stopped moving so that said operator can be moved to parking position.

11. In a control device for a motor powered vehicle having an automatic transmission with an operator for positioning said transmission in neutral and parking out-of-gear positions and in in-gear positions, the combination of first means operatively connected to said operator for moving it to said out-of-gear positions, a second means operatively connected to said operator to block its movement to in-gear positions, a third means energized upon stopping of the motor for operating the first means, and fourth means energized upon movement of the vehicle for operating said second means.

12. An automatic transmission control device for automatic transmissions, said transmissions having an operator to adjust them to in-gear positions including reverse and out-of-gear positions including park and neutral, first means operatively connected to said operator for moving it to said out-of-gear positions, second means energized upon stalling of the motor for operating the first means to move the operator to neutral position, third means energized upon substantial stopping of the vehicle and energizing of the second means for operating the first means to move the operator to park position, fourth means operatively connected to said operator for blocking its movement to reverse position, and fifth means energized during substantial movement of the vehicle for operating said fourth means.

13. In a transmission control for a motor vehicle having an automatic transmission, said transmission having an operator for adjusting it to out-of-gear positions including neutral and park and in-gear positions including reverse, a shifter element capable of operating connection at one end to said operator, spring means urging said element to contact said operator and to move the operator toward out-of-gear position, fluid pressure means urging said element to move away from said operator to free said operator for movement to in-gear positions, said fluid pressure means being operated by fluid furnished during operation of the motor and being inoperative when the motor is inoperative, a latch capable of operative connection to said shifter element to block its movement to a position wherein it will move the operator to park, and means responsive to the speed of the vehicle for operating said latch and upon reduction in said speed below a predetermined minimum releasing said latch.

14. The invention set forth in claim 13 including a block element for operative connection with said operator to prevent its movement to reverse position, said block element being operated by said speed responsive means.

15. The invention set forth in claim 13 wherein said fluid pressure means is based upon motor vacuum and includes solenoid means energized during operation of the motor to hold said element in place in the event of fall-off of vacuum while the motor is running.

References Cited in the file of this patent

UNITED STATES PATENTS

| | | |
|---|---|---|
| 2,661,730 | Schneider et al. | Dec. 8, 1953 |
| 2,670,064 | Hasbany | Feb. 23, 1954 |
| 2,685,873 | Cook | Aug. 10, 1954 |
| 2,689,029 | McFarland | Sept. 14, 1954 |